US012208669B2

(12) United States Patent
Landvik

(10) Patent No.: US 12,208,669 B2
(45) Date of Patent: Jan. 28, 2025

(54) FRAME STRUCTURE FOR A VEHICLE

(71) Applicant: Volvo Truck Corporation, Gothenburg (SE)

(72) Inventor: Sondre Landvik, Gothenburg (SE)

(73) Assignee: Volvo Truck Corporation, Gothenburg (SE)

(*) Notice: Subject to any disclaimer, the term of this patent is extended or adjusted under 35 U.S.C. 154(b) by 447 days.

(21) Appl. No.: 17/677,023

(22) Filed: Feb. 22, 2022

(65) Prior Publication Data
US 2022/0281306 A1   Sep. 8, 2022

(30) Foreign Application Priority Data
Mar. 2, 2021   (EP) ..................... 21160252

(51) Int. Cl.
*B60K 1/04*   (2019.01)
*B60K 1/00*   (2006.01)
(Continued)

(52) U.S. Cl.
CPC .............. *B60K 1/04* (2013.01); *B60K 1/00* (2013.01); *B60L 50/66* (2019.02); *B62D 21/11* (2013.01);
(Continued)

(58) Field of Classification Search
CPC ........ B62D 21/02; B62D 21/03; B62D 21/04; B62D 21/09; B62D 21/10; B62D 33/02; B60K 1/04; B60K 2001/0438
See application file for complete search history.

(56) References Cited

U.S. PATENT DOCUMENTS 2,846,263 A  *  8/1958  La Rue ................. B62D 21/20
                                                    296/184.1
3,622,171 A  *  11/1971  Gottschalk ............. B66C 23/62
                                                    296/204
(Continued)

FOREIGN PATENT DOCUMENTS

CN         106184371 A       12/2016
CN         206528528 U        9/2017
(Continued)

OTHER PUBLICATIONS

Translation of DE 102020004026 (Year: 2020).*
(Continued)

*Primary Examiner* — Katy M Ebner
(74) *Attorney, Agent, or Firm* — Withrow & Terranova, PLLC

(57) ABSTRACT

The present disclosure relates to a frame structure for a vehicle comprising a front wheel suspension arrangement for suspending a pair of front wheels of the vehicle and a rear wheel suspension arrangement for suspending a pair of rear wheels of the vehicle, wherein the frame structure comprises a load bearing frame arrangement arranged to be positioned at a transversal center portion of the vehicle, the load bearing frame arrangement comprising a first member and a second member, each of the first and second members forming a diagonal extension as seen in a transversal cross section of the load bearing frame arrangement, wherein the diagonal first and second members extend longitudinally between the front wheel suspension arrangement and the rear wheel suspension arrangement, wherein the diagonal extension of the first member interconnects with the diagonal extension of the second member forming a connection point between the first and second members.

15 Claims, 2 Drawing Sheets

(51) Int. Cl.
   B60L 50/60    (2019.01)
   B62D 21/11    (2006.01)
   B62D 33/00    (2006.01)

(52) U.S. Cl.
   CPC ...... *B62D 33/00* (2013.01); *B60K 2001/0416* (2013.01)

(56) References Cited

U.S. PATENT DOCUMENTS

| | | | | |
|---|---|---|---|---|
| 4,160,558 A * | 7/1979 | Fritsch | ............... | B66C 23/62 |
| | | | | 280/797 |
| 4,276,985 A * | 7/1981 | Newman | ............ | B66C 23/78 |
| | | | | 212/177 |
| 4,570,973 A * | 2/1986 | Ewers | ............... | B62D 21/04 |
| | | | | 296/204 |
| 6,641,206 B1 * | 11/2003 | Bergstrom | ........ | B62D 29/008 |
| | | | | 296/184.1 |
| 6,712,393 B2 * | 3/2004 | Philipps | ............ | B62D 21/02 |
| | | | | 280/795 |
| 7,600,785 B2 * | 10/2009 | Ramsey | ............ | B60G 11/27 |
| | | | | 280/781 |
| 9,067,624 B2 * | 6/2015 | Outen | ............... | B62D 21/02 |
| 9,108,677 B2 * | 8/2015 | Kerr | ................... | B62D 21/20 |
| 9,315,213 B2 * | 4/2016 | Raymond | ......... | B62D 25/06 |
| 9,988,086 B1 * | 6/2018 | Adkins, Jr. | ....... | B62D 25/2054 |
| 10,787,200 B1 * | 9/2020 | Smith, Jr. | .......... | B62D 21/20 |
| 10,946,824 B2 * | 3/2021 | Kunkel | ............. | B60R 19/565 |
| 11,685,268 B2 * | 6/2023 | Sjöholm | ............ | B62D 27/02 |
| | | | | 180/68.5 |
| 11,766,925 B2 * | 9/2023 | Landvik | ........... | H01M 50/204 |
| | | | | 180/68.5 |
| 2004/0134699 A1 * | 7/2004 | Shimizu | ............ | B62D 25/20 |
| | | | | 180/68.5 |
| 2007/0216147 A1 * | 9/2007 | Ramsey | ............ | B60G 9/003 |
| | | | | 280/781 |
| 2019/0291559 A1 * | 9/2019 | Trenne | .............. | B62K 5/05 |
| 2020/0331536 A1 * | 10/2020 | Sloan | ................ | B62D 25/088 |
| 2021/0046978 A1 * | 2/2021 | Forostovsky | ...... | B60G 3/20 |

FOREIGN PATENT DOCUMENTS

| | | |
|---|---|---|
| CN | 107379949 A | 11/2017 |
| CN | 109421805 A | 3/2019 |
| DE | 102020004026 A1 * | 8/2020 |
| EP | 3696054 A1 | 8/2020 |
| GB | 2515535 A | 12/2014 |
| JP | 2018176798 A | 11/2018 |
| WO | 0063060 A1 | 10/2000 |

OTHER PUBLICATIONS

Extended European Search Report for European Patent Application No. 21160252.9, mailed Aug. 12, 2021, 9 pages.

First Office Action for Chinese Patent Application No. 202210168024.2, mailed Jan. 15, 2024, 17 pages.

* cited by examiner

FRAME STRUCTURE FOR A VEHICLE

RELATED APPLICATIONS

The present application claims priority to European Patent Application No. 21160252.9, filed on Mar. 2, 2021, and entitled "FRAME STRUCTURE FOR A VEHICLE," which is incorporated herein by reference in its entirety.

FIELD OF THE DISCLOSURE

The present invention relates to a frame structure for a vehicle. The invention also relates to a vehicle comprising such a frame structure. The frame structure is applicable on vehicles, in particularly trucks which are propelled by electric machines. Although the invention will mainly be described in relation to a truck, it may also be applicable for other type of vehicles propelled by electric machines and where a conventional propeller shaft is omitted.

BACKGROUND

The propulsion systems of vehicles are continuously developed to meet the demands from the market. A particular aspect relates to the emission of environmentally harmful exhaust gas. Therefore, vehicles propelled by electric machines have been increasingly popular, both for cars as well as for trucks and other heavy duty vehicles.

In relation to heavy duty vehicles, the battery connected to the electric machine propelling the vehicle needs to be relatively large to be able to deliver a substantial amount of electric power to the electric machine(s), in particular when aiming for covering a long driving range without having to charge the battery.

A conventional placement of the batteries in a heavy duty vehicle is along the longitudinally extending frame rails of the vehicle. This is substantially the same position as used for the fuel tanks of a truck using an internal combustion engine for propulsion. However, this position does not make room for sufficiently large batteries and the conventional frame rails are not dimensioned for the relatively large load of vehicle batteries. There is thus a desire to improve the vehicle structure to handle vehicle batteries of sufficient size.

SUMMARY

It is an object of the present invention to provide a frame structure that at least partly overcomes the above-described deficiencies. This object is achieved by a frame structure.

According to a first aspect, there is provided a frame structure for a vehicle comprising a front wheel suspension arrangement for suspending a pair of front wheels of the vehicle, and a rear wheel suspension arrangement for suspending a pair of rear wheels of the vehicle, wherein the frame structure comprises a load bearing frame arrangement arranged to be positioned at a transversal center portion of the vehicle, the load bearing frame arrangement comprising a first member and a second member, each of the first and second members forming a diagonal extension as seen in a transversal cross section of the load bearing frame arrangement, wherein the diagonal first and second members extend longitudinally between the front wheel suspension arrangement and the rear wheel suspension arrangement, wherein the diagonal extension of the first member interconnects with the diagonal extension of the second member forming a connection point between the first and second members.

The load bearing frame arrangement is preferably occupying the position of a conventional propeller shaft. Since the vehicle preferably does not comprise such a propeller shaft, the load bearing frame arrangement can be arranged at this position. The diagonal extension of the first and second members will increase the stiffness of the load bearing frame arrangement which can absorb the load generated by relatively heavy vehicle batteries connected to the frame. Also, the diagonal extension of the first and second members present an improved bending stiffness as well as an improved torsional stiffness.

Furthermore, as the load bearing frame arrangement is arranged at the transversal center portion of the vehicle, larger batteries can be arranged on each side of the load bearing frame arrangement compared to conventional longitudinally extending frame rails of the vehicle, since there is more available space for the batteries. Furthermore, and as will be described in further detail below, the diagonal extension of the first and second members enables for channels/space that allows for packaging of routing highways, power electronic components and other components. Also, an easier and more rapid assembly of larger modules is provided since pre-mounting of routing and components on the diagonal first and second members are possible.

According to an example embodiment, the connection point may be positioned along the diagonal extension of the first and second members. Thus, the loads absorbed by the load bearing frame arrangement is directed through the connection point. Preferably, and according to an example embodiment, the connection point may be arranged to be positioned at the transversal center portion of the vehicle.

According to an example embodiment, the first and second members may be connected to each other by a fastening element to form the connection point. In such a case, the first and second members are formed as separate components connected to each other. An advantage is that a simplified manufacturing process is provided. The first and second members may preferably be formed as ninety degrees rotated V-shaped portions. According to an example embodiment, the diagonal extension of the first member may interconnect with the diagonal extension of the second member forming an X-shaped, longitudinally extending, load carrying beam. In the case of rotated V-shaped portions, these can thus be connected to each other to form the X-shape. The X-shaped load bearing frame arrangement can however be formed as one solid portion, whereby the connection point is formed by the waist portion of the X-shape.

According to an example embodiment, the frame structure may further comprise a plurality of brackets connected to the load bearing frame arrangement. The brackets can increase the stiffness of the frame structure while at the same time serve as connector elements for the vehicle battery/batteries. Preferably, and according to an example embodiment, each of the plurality of brackets may be connected to the load bearing frame arrangement and extends transversally away from the connection point. Hereby, the brackets can protect the batteries during e.g. a side collision as the load from such side collision will be directed through the bracket directly to the stiff load bearing frame arrangement.

According to an example embodiment, the brackets may be positioned along the longitudinal extension of the load bearing frame arrangement at a predetermined distance from each other. Hereby, battery modules may be connected to the frame structure between a pair of brackets.

According to an example embodiment, the frame structure may further comprise an upper panel structure fixated to a vertical upper portion of the load bearing frame arrangement. The upper panel may even further increase the stiffness of the frame structure. Preferably, and according to an example embodiment, the upper panel structure may comprise an extension in the transversal and longitudinal direction of the load bearing arrangement. The upper panel may also preferably be supported by, and connected to, the above-described brackets. According to an example embodiment, the upper panel structure may be fixated to a vertical upper portion of the plurality of brackets.

According to an example embodiment, the upper panel structure may comprise an access lid positioned vertically above the connection point. Hereby, access to a cavity formed between the upper panel structure and the connection point is provided. The cavity can thus serve as a location for storing e.g. high voltage cables, low voltage cables, cooling pipes, pneumatic pipes, etc. Other components and structures can of course also be arranged in this cavity and the access lid allows an operator to gain access to these components and structures. The access lid can be arranged directly above the connection point.

According to an example embodiment, the frame structure may further comprise a lower panel structure fixated to a vertical lower portion of the load bearing frame arrangement. The stiffness of the frame structure can hereby be even further improved. The upper and lower panel structure, together with the load bearing frame arrangement thus form a high strength "box-shaped structure".

According to a second aspect, there is provided a vehicle, comprising a front wheel suspension arrangement for suspending a pair of front wheels of the vehicle, and a rear wheel suspension arrangement for suspending a pair of rear wheels of the vehicle, and a frame structure according to any one of the embodiments described above in relation to the first aspect, wherein the frame structure extends between the front wheel suspension arrangement and the rear wheel suspension arrangement.

According to an example embodiment, the vehicle may comprise a electric machine for propelling the vehicle, the vehicle further comprises a plurality of vehicle batteries electrically connected to the electric machine, wherein the vehicle batteries are connected to the load bearing frame arrangement transversally outside the connection point.

Effects and features of the second aspect are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present disclosure, will be better understood through the following illustrative and non-limiting detailed description of exemplary embodiments, wherein.

DETAILED DESCRIPTION

Figure 1:
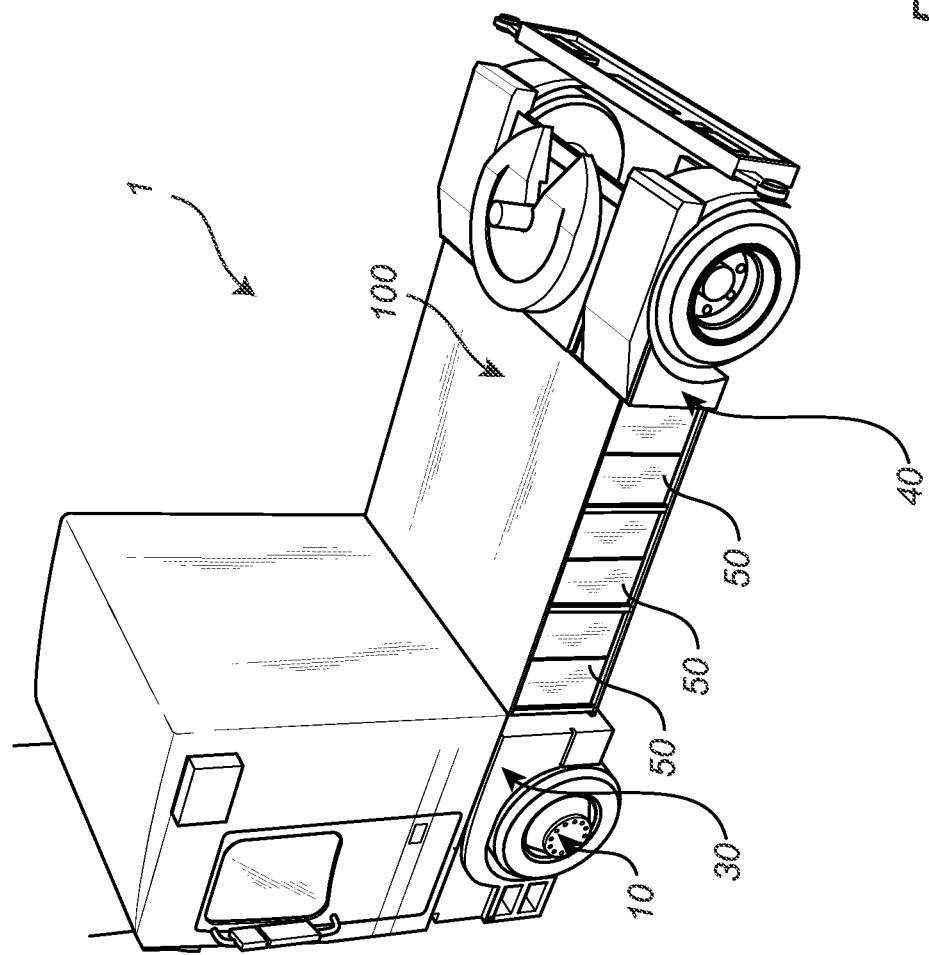
FIG. 1 is a perspective view of a vehicle according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With initial reference to FIG. 1, there is provided a vehicle 1 in the form of a truck. The vehicle 1 illustrated in FIG. 1 comprises a pair of front wheels 10 and a pair of rear wheels 20. It should however be readily understood that the vehicle 1 may equally as well comprise a first pair of rear wheels and a second pair of rear wheels, where the first pair of wheels is positioned longitudinally in front of the second pair of rear wheels. The second pair of rear wheels may be connected to a so-called tag-axle and the first pair of rear wheels may be connected to a so-called pusher axle.

Furthermore, the vehicle 1 comprises a plurality of modules 50 arranged to supply power for propelling an electric machine (not shown) of the vehicle 1. The vehicle 1 is thus operated using at least one electric machine, which can be arranged in the form of wheel hub motors or a single electric motor connected to e.g. the pair of front wheels. The modules 50 may thus form a plurality of vehicle batteries for supplying electrical power to the electric machine. The modules 50 may on the other hand, as an alternative, form a plurality of hydrogen tanks comprising hydrogen fuel which is supplied to a fuel cell system that generates electric power to be supplied to a battery or directly to the electric machine.

As is further illustrated in FIG. 1, the vehicle comprises a frame structure 100. The frame structure comprises a front wheel suspension arrangement 30 and a rear wheel suspension arrangement 40. The front 30 and rear 40 wheel suspension arrangements are not depicted in detail in FIG. 1 but should be understood to suspend the pair of front wheels 10 and pair of rear wheels 20, respectively. The frame structure 100 further comprises a load bearing frame arrangement 102 (see FIGS. 2-3) extending between the front 30 and rear 40 wheel suspension arrangements. The vehicle 1 depicted in FIG. 1 does hence not contain a conventional frame structure which is composed of two longitudinally extending frame rails positioned at a transversal distance from each other. Instead, the frame structure 100 comprises the load bearing frame arrangement 102 which is positioned at a transversal center portion of the vehicle 1. Since the vehicle is propelled by electric machine(s), the vehicle does not contain a conventional propeller shaft. The load bearing frame arrangement 102 is therefore preferably positioned in the space which, for an ICE operated vehicle, is conventionally occupied by such propeller shaft.

Figure 2:
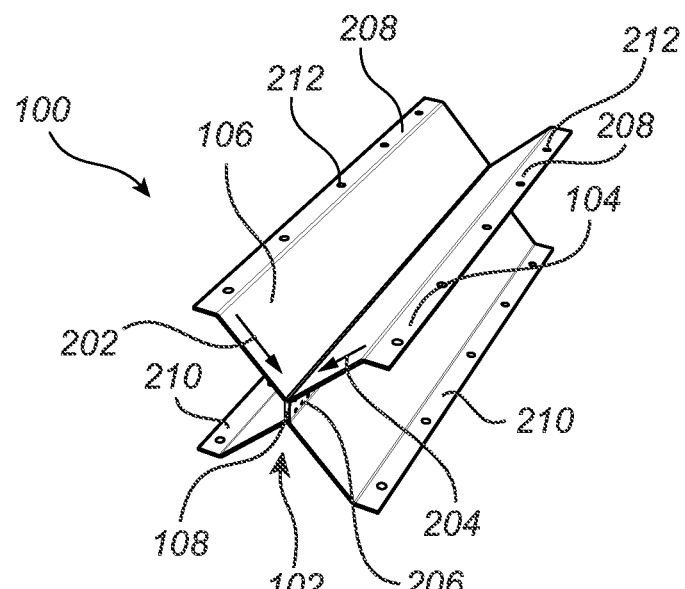
FIG. 2 is a perspective view of a load bearing frame arrangement according to an example embodiment.

In order to describe the frame structure 100 in further detail, reference is now made to FIG. 2. As can be seen, the frame structure 100 comprises the above mentioned load bearing frame arrangement 102 which is, when arranged on the vehicle 1, positioned at a transversal center portion and extending in the longitudinal direction of the vehicle 1. The load bearing frame arrangement 102 comprises a first member 104 and a second member 106. The first 104 and second 106 members are extending in the longitudinal direction of the vehicle 1 between, as also indicated above, between the front 30 and rear 40 wheel suspension arrangements. Further, and as seen in a transversal cross section of the load bearing frame arrangement 102, each of the first 104 and second 106 members comprises an extension in a diagonal direction, which are indicated by arrows numbered 202 and 204. The diagonal extension 204 of the first member 104 interconnects with the diagonal extension 202 of the second member 106, thereby forming a connection point 108 between the first 104 and second 106 members. The load bearing frame arrangement 102 is hereby forming an X-shaped, longitudinally extending, load carrying beam.

Preferably, and as illustrated in FIG. 2, the connection point 108 is positioned along the diagonal extension of first 104 and second 106 member, preferably at the transversal center portion of the vehicle 1. The first 104 and second 106 members may, as illustrated in FIG. 2, be formed by a respective first and second plate structure, which plate structures are connected to each other at the connection point 108 by fastening elements 206. The fastening elements 206 can, for example, be formed by screw joints, bolts, rivets, welds, etc. The first 104 and second 106 members are in this configuration formed as a respective rotated V-shaped member which are fixated to each other to form the X-shaped beam.

As an alternative, the X-shaped beam can be formed in one piece in which the above-described fastening elements 206 are superfluous. The X-shaped beam can be formed as a one piece structure by casting or extrusion, etc. A one piece X-shaped beam still comprises the connection point 108 between the diagonally extending first and second members.

As is further illustrated in FIG. 2, each of the first 104 and second 106 members comprises a substantially horizontal upper support portion 208 as well as a substantially horizontal lower support portion 210. The upper 208 and lower 210 support portions are arranged as support surfaces for connecting to an upper and a lower panel structure (see 112 and 116 in FIG. 3). The upper panel structure 112 is connected to the load bearing frame arrangement 102 at the upper support portion 208 by means of suitable fastening elements 212, such as e.g. screws, bolts, rivets, welds, etc. In a similar vein, the lower panel structure 116 is connected to the load bearing frame arrangement 102 at the lower support portion 210 by means of suitable fastening elements 212, such as e.g. screws, bolts, rivets, welds, etc.

Figure 3:
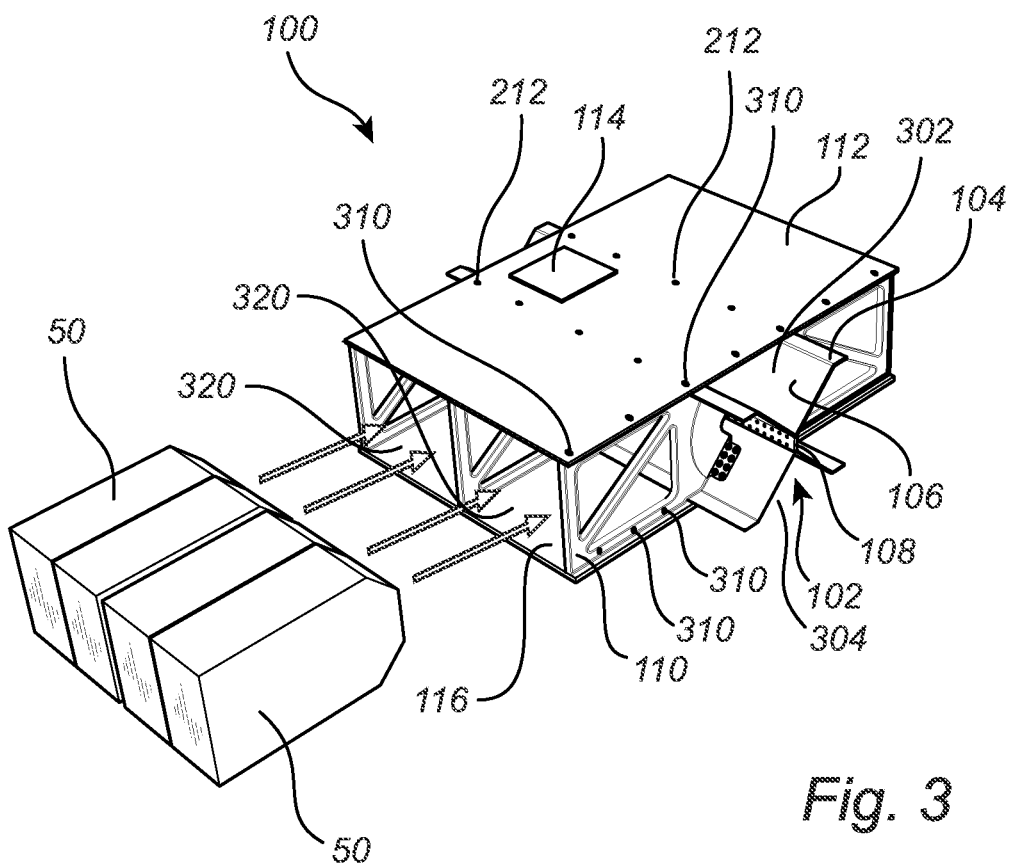
FIG. 3 is a perspective view of a frame structure comprising the load bearing frame arrangement in FIG. 2 according to an example embodiment.

Turning now to FIG. 3 which illustrates the above-described frame structure 100 according to an example embodiment. As described above, the frame structure 100 comprises the X-shaped load bearing frame arrangement 102. As can be seen in FIG. 3, the upper 112 and lower 116 panel structures connected to the load bearing frame arrangement 102 by means of the fastening elements 212. The upper 112 and lower 116 panel structures each has an extension in the transversal direction as well as in the longitudinal direction of the vehicle 1, thereby forming a "roof" and "floor" for the frame structure 100. Preferably, and as illustrated in FIG. 1, the upper 112 and lower 116 panels extend between the front 30 and rear 40 wheel suspension arrangements, thereby forming a full cover both above as well as below the X-shaped load bearing frame arrangement 102. The upper panel structure 112 is, together with the load bearing frame arrangement 102, forming an upper volume 302 or cavity. In particular, an upper portion of the load bearing frame arrangement 102 is arranged in a V-shape, which forms the upper volume 302 or cavity. In a similar vein, the lower panel structure 116 is, together with the load bearing frame arrangement 102, forming a lower volume 304 or cavity. In particular, a lower portion of the load bearing frame arrangement 102 is arranged in a reversed V-shape, which forms the lower volume 304 or cavity. The upper 302 and lower 304 volumes/cavities are advantageously used for packaging of components, such as routing of media, cablings, etc. As is also illustrated in FIG. 3, the upper panel structure 112 comprises an access lid 114. Hereby, the components positioned within the upper volume 302 are accessible by an operator of the vehicle, or during maintenance. Although not depicted in the figures, the lower panel structure may also comprise a similar access lid for gaining simplified access to the lower volume 304.

The frame structure 100 further comprises a plurality of brackets 110 arranged laterally outside the load bearing frame arrangement 102. In particular, each of the brackets are connected to the load bearing frame arrangement 102 and extends in a direction transversally away from the above-described connection point 108. The brackets 110 are positioned along the longitudinal extension of the load bearing frame arrangement 102 at a predetermined distance from each other. The brackets 110 are preferably connected to the load bearing frame arrangement 102 by means of fastening elements 308, such as screws, bolts, rivets, etc. The brackets 110 are further also attached/connected to the upper 112 and lower 116 panel structures by means of bracket connectors 310 in the form of e.g. screws, bolts, rivets, etc.

The brackets 110, together with the load bearing frame arrangement 102, the upper panel structure 112 and the lower panel structure 116 forms a cavity 320 in which the modules 50, in the following merely referred to as batteries/battery modules, can be positioned. In particular, one or more battery modules can be arranged between a pair of brackets in the cavity 320 formed therebetween. The batteries are, after insertion to the cavity 320, fixated to the frame structure in a suitable manner By arranging the battery modules in this manner, the brackets will act as a load transferring element in case of e.g. a side collision. The load from such a side collision will thus be transferred to the load bearing frame arrangement 102 via the brackets 110, thereby protecting the batteries form damage.

As can thus be seen in FIG. 3, the frame structure (100) comprises a plurality of brackets positioned along the longitudinal extension of the load bearing frame arrangement at a predetermined distance from each other, wherein each of the plurality of brackets is connected to the diagonally extending first (104) and second (106) members and extends transversally away from the connection point.

It is to be understood that the present disclosure is not limited to the embodiments described above and illustrated in the drawings; rather, the skilled person will recognize that many changes and modifications may be made within the scope of the appended claims.

The invention claimed is:

1. A frame structure for a vehicle comprising:
a front wheel suspension arrangement for suspending a pair of front wheels of the vehicle, and a rear wheel suspension arrangement for suspending a pair of rear wheels of the vehicle,
wherein the frame structure further comprises:
a load bearing frame arrangement arranged to be positioned at a transversal center portion of the vehicle, the load bearing frame arrangement comprising:
a first member, and
a second member, wherein each of the first and second members form a diagonal extension in a transversal cross section of the load bearing frame arrangement, wherein the first and second members extend longitudinally between the front wheel suspension arrangement and the rear wheel suspension arrangement, and wherein the diagonal extension of the first member directly connects with the diagonal extension of the second member forming a connection point between the first and second members, and wherein the frame structure further comprises a plurality of brackets positioned along the longitudinal extension of the load bearing frame arrangement at a predetermined distance from each other, each of the plurality of brackets being connected to one of the first and second members of the load bearing frame arrangement and extending transversally away from the connection point.

2. The frame structure of claim 1, wherein the connection point is positioned along the diagonal extension of the first and second members.

3. The frame structure of claim 1, wherein the connection point is positioned at the transversal center portion of the vehicle.

4. The frame structure of claim 1, wherein the first and second members are connected to each other by a fastening element to form the connection point.

5. The frame structure of claim 1, wherein the diagonal extension of the first member interconnects with the diagonal extension of the second member forming an X-shaped, longitudinally extending, load carrying beam.

6. The frame structure of claim 1, further comprising an upper panel structure fixed to a vertical upper portion of the load bearing frame arrangement.

7. The frame structure of claim 6, wherein the upper panel structure comprises an extension in the transversal and longitudinal directions of the load bearing arrangement.

8. The frame structure of claim 6, wherein the upper panel structure comprises an access lid positioned vertically above the connection point.

9. The frame structure of claim 6, wherein the upper panel structure is fixed to a vertical upper portion of the plurality of brackets.

10. The frame structure of claim 1, further comprising a lower panel structure fixed to a vertical lower portion of the load bearing frame arrangement.

11. A vehicle comprising:
a front wheel suspension arrangement for suspending a pair of front wheels of the vehicle;
a rear wheel suspension arrangement for suspending a pair of rear wheels of the vehicle; and
a frame structure of claim 1,
wherein the frame structure extends between the front wheel suspension arrangement and the rear wheel suspension arrangement.

12. The vehicle of claim 11, further comprising:
an electric machine for propelling the vehicle, and
a plurality of vehicle batteries electrically connected to the electric machine,
wherein the vehicle batteries are connected to the load bearing frame arrangement transversally outside the connection point.

13. The vehicle of claim 11, wherein the connection point of the frame structure is positioned at the transversal center portion of the vehicle.

14. The vehicle of claim 11, wherein the first and second members of the frame structure are connected to each other by a fastening element to form the connection point.

15. The vehicle of claim 11, wherein the frame structure further comprises an upper panel structure fixed to a vertical upper portion of the load bearing frame arrangement.

* * * * *